(12) United States Patent
Coupard et al.

(10) Patent No.: US 7,935,855 B2
(45) Date of Patent: May 3, 2011

(54) PROCESS AND APPARATUS FOR TREATING A FEED COMPRISING BUTADIENE

(75) Inventors: Vincent Coupard, Vaulx En Velin (FR); Reynald Bonneau, Villeurbanne (FR); Sylvain Louret, Lyons (FR)

(73) Assignee: IFP Energies Nouvelles, Rueil-Malmaison, Cedex (FR)

( * ) Notice: Subject to any disclaimer, the term of this patent is extended or adjusted under 35 U.S.C. 154(b) by 795 days.

(21) Appl. No.: 11/547,727

(22) PCT Filed: Mar. 22, 2005

(86) PCT No.: PCT/FR2005/000698
§ 371 (c)(1),
(2), (4) Date: Dec. 27, 2007

(87) PCT Pub. No.: WO2005/108529
PCT Pub. Date: Nov. 17, 2005

(65) Prior Publication Data
US 2008/0119675 A1 May 22, 2008

(30) Foreign Application Priority Data
Apr. 9, 2004 (FR) .................................. 04 03822

(51) Int. Cl.
*C07C 5/09* (2006.01)
*C07C 7/163* (2006.01)
*C10G 45/32* (2006.01)

(52) U.S. Cl. ........ 585/264; 585/259; 585/810; 208/144; 202/262; 422/187

(58) Field of Classification Search .................. 585/250, 585/258, 259, 264, 324, 500, 810; 422/187; 203/28, 29, 98, 99; 202/254, 262; 208/142–145
See application file for complete search history.

(56) References Cited

U.S. PATENT DOCUMENTS

| 6,072,091 | A  | * | 6/2000 | Cosyns et al. ................ 585/259 |
| 6,175,049 | B1 |   | 1/2001 | Stuwe et al. |
| 6,740,787 | B2 |   | 5/2004 | Pinault et al. |
| 2003/0181772 | A1 | * | 9/2003 | Meyer et al. .................. 585/324 |
| 2004/0045804 | A1 | * | 3/2004 | Bohner et al. ..................... 203/1 |

FOREIGN PATENT DOCUMENTS

| EP | 0 122 367 A | 10/1984 |
| EP | 0 982 280 A | 3/2000 |
| EP | 1 217 060 A | 6/2002 |
| WO | WO 01/85656 A | 11/2001 |

* cited by examiner

*Primary Examiner* — Walter D Griffin
*Assistant Examiner* — Renee Robinson
(74) *Attorney, Agent, or Firm* — Millen, White, Zelano & Branigan, P.C.

(57) ABSTRACT

The invention concerns a process and apparatus for treating a feed comprising ethylenic and acetylenic compounds. In the process of the invention, the feed is sent to a distillation step, a C4 cut and a C5+ cut are recovered, a drawn fraction comprising acetylenic compounds is treated in at least one hydrogenation step, and an effluent which is depleted in acetylenic compounds is recycled. The distillation step comprises:
  an initial step for pre-fractionating the feed, carried out in a pre-fractionation zone included in a distillation column; and
  at least one complementary fractionation step, carried out in a zone which comprises a portion A, which is distinct from and not adjacent to the portion B of the pre-fractionation zone below the supply, in which the fraction drawn from a point in A is recovered with a C4/C5+ ratio that is higher than that of the feed.

9 Claims, 2 Drawing Sheets

PROCESS AND APPARATUS FOR TREATING A FEED COMPRISING BUTADIENE

FIELD OF THE INVENTION

Figure 1:
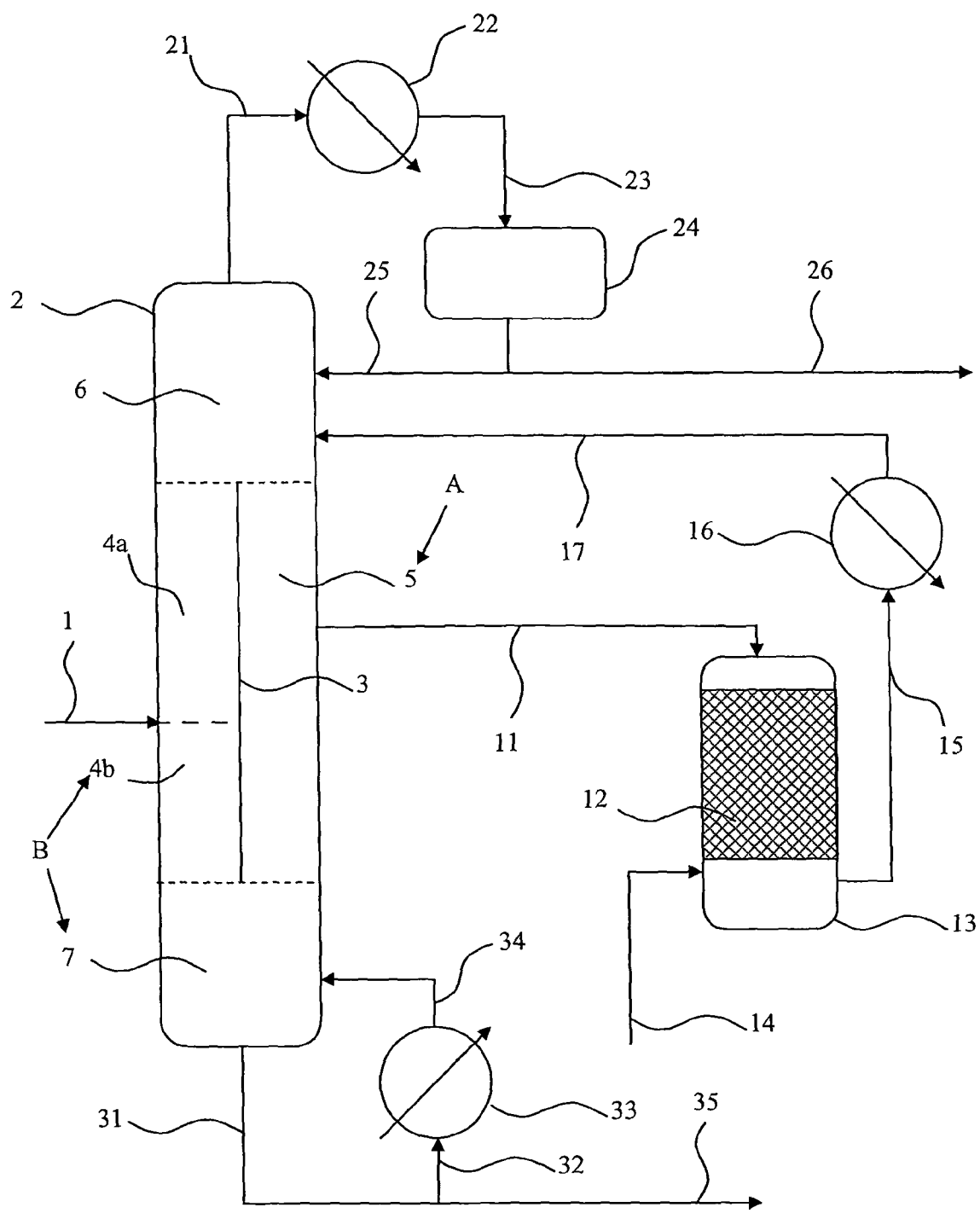

The invention relates to the field of processes and facilities for processing a feed comprising butadiene, C5+ unsaturated compounds and acetylenic compounds to eliminate acetylenics and fractionate the feed to produce butadiene. The term Cn+ refers to hydrocarbons containing n carbon atoms or more, but can also refer to hydrocarbons containing exclusively n carbon atoms (Cn).

PRIOR ART

European patent application EP-A-1 217 060 discloses sending a feed to a distillation step from which are recovered a C4 cut comprising substantially all of the butadiene, a C5+ cut and a fraction that is rich in acetylenic compounds as a side stream, processing the fraction that is rich in acetylenic compounds in a hydrogenation step, and recycling an effluent that is depleted in acetylenic compounds from the hydrogenation step in a distillation step.

There exists a need to hydrogenate the acetylenic compounds contained in that type of feed with improved selectivity, under conditions in which the hydrogenation catalyst deactivates only slowly.

There is also a need for a limitation of butadiene losses due to distillation and hydrogenation of a very butadiene-rich feed.

BRIEF DESCRIPTION OF THE INVENTION

The improvement provided by the present invention principally resides in the development of a distillation step comprising a feed pre-fractionation step and a complementary fractionation step in a zone that is separate from the zone supplying the pre-fractionation, to allow withdrawal of a stream to be hydrogenated that is free of a substantial portion of the pollutants for the hydrogenation catalysts.

The invention also resides in the fact that the hydrogenation step is carried out on a fraction that is rich in acetylenic compounds and low in C5+.

DETAILED DESCRIPTION OF THE INVENTION

The invention concerns a process for the treatment of a feed comprising acetylenic compounds, butadiene and a C5+ fraction comprising diethylenic and/or acetylenic compounds, for example pentadiene and/or cyclopentadiene, in which the feed is sent to a distillation step, a C4 cut comprising substantially all of the butadiene is recovered, a C5+ enriched cut is recovered, and a drawn fraction comprising acetylenic compounds is produced, at least a portion of the acetylenic compound-enriched fraction is treated in at least one hydrogenation step, and an effluent that is depleted in acetylenic compounds from the hydrogenation step is recycled to the distillation step.

One aim of the process of the invention is the selective hydrogenation of acetylenic compounds contained in the feed in the presence of hydrogen, while minimizing deactivation of the hydrogenation catalyst by oligomers, polymers and their precursors.

A further aim of the process of the present invention is to carry out substantial purification (in particular by eliminating a great deal of the acetylenics) of a feed which may be very rich in butadiene without substantially reducing the cycle duration of the hydrogenation catalyst, while minimizing butadiene losses as far as possible.

The invention will now be described using the reference numerals appearing in FIG. 1.

We have discovered a process for treating a feed comprising acetylenic compounds, butadiene and a C5+ fraction comprising diethylenic and/or acetylenic compounds, for example pentadiene and/or cyclopentadiene, in which:

i) the feed is sent to a distillation step, a C4 cut that comprises substantially all of the butadiene is recovered, a cut that is enriched in C5+ is recovered and a drawn fraction comprising acetylenic compounds is produced;
ii) at least a portion of said drawn fraction is treated in at least one hydrogenation step; and
iii) an effluent that is depleted in acetylenic compounds from the hydrogenation step is recycled to the distillation step;

characterized in that the distillation step comprises:

an initial step for pre-fractionation of the feed, which latter is supplied to a pre-fractionation zone (4a, 4b, 6, 7) included in a distillation column, to obtain at least one intermediate stream with a reduced C5+ content at one or more intermediate levels of the column; and
at least one step for fractionation by distillation of the intermediate stream or streams, carried out in a complementary fractionation zone at least a portion A (5) of which is distinct from and not adjacent to the portion B (4b, 7) of the pre-fractionation zone constituted by the feed supply plate and the lower plates, to withdraw the drawn fraction from a point in A for which the mole ratio [C4/C5+] is higher than that of the feed.

According to the invention, the portion A is considered to be "distinct from and not adjacent" to the portion B if A and B are not joined and thus do not have a common portion, and if a plate of A is separate from a plate of B which is above or below it by at least 1 theoretical plate. This also applies to plates A and B located at the same level but either side of a vertical partition in the column. Since the plates are separated by said partition and are not one above the other, they can thus be considered to be "not adjacent". Material separation such as a partition between A and B is not necessary. The "lower plates" are plates onto which the liquid from the supply plate (receiving the liquid portion of the feed) flows as a cascade. Said lower plates thus do not include plates located at a level lower than that of the feed supply, but in a zone isolated from said supply.

Thus, the invention allows fractionation to be carried out in two steps, in which at least part of the second step is carried out in a zone that is clearly distinct from and not adjacent to the feed supply zone. Said separation, or distance, prevents dilution of products moving in this zone by impurities present in the supply. The feed frequently contains products that are harmful to the isomerization catalyst: traces of oligomers and polymers, relatively heavy diethylenic and/or acetylenic C5+ compounds which may form additional heavier products (oligomers and polymers), and even small quantities of solid coke particles.

According to the invention, all of these unwanted relatively heavy compounds will tend to flow towards the bottom of the pre-fractionation zone and thus drop into portion B of said zone (the portion comprising the supply plate and the lower plates (in liquid communication with said plates), finally leaving via the column bottom. Using a complementary fractionation zone a portion A of which is distinct and not adjacent to B means that A is at least partially removed from the influence of said unwanted compounds, in particular oligomers and polymers, most of which fall into zone B.

Withdrawal from A at a point such that the C4/C5+ mole ratio is greater than that of the feed can limit the presence of unwanted C5+ compounds which are precursors for oligomers and polymers. Thus, this allows a product comprising a reduced quantity of pollutants that may deleteriously affect the efficiency and the hydrogenation catalyst to be sent to the hydrogenation step. Hydrogenation catalysts are typically inhibited by substantial quantities of oligomers or polymers, or their precursors, in particular the heaviest diethylenic and acetylenic compounds.

The catalyst, which is less polluted, is more efficient, typically more selective (for the hydrogenation of acetylenics, conserving butadiene the best, especially as it can operate under substantially optimum operating conditions without having to compensate for deactivation by modifying the operating conditions), and with an increased service life. It can also lead to greater purification and lower butadiene losses.

Highly preferably, the drawn fraction is withdrawn from a level in the column that is higher than that of the feed supply point. This contributes to a substantial increase in the C4/C5+ of the drawn fraction.

Typically, the effluent depleted in acetylenic compounds from the hydrogenation step is recycled to a level in the distillation column located above the level for withdrawal of the drawn fraction, and above portions A and B. The term "above" as used in the invention means that not only is recycling carried out to a higher level, but also it causes an internal reflux of liquid into the two zones A and B (typically in parallel or in series). Thus, recycling caused absorption of acetylenics, which are caused to flow back towards the bottom of the column, to obtain a concentrating effect for these acetylenics in the drawn fraction. In correlation, the cut comprising butadiene at the head of the column contains only very few acetylenics. The withdrawal point for said drawn fraction can advantageously be located at the point of maximum concentration for the acetylenics, in particular vinyl acetylene, or close to this point.

In a first variation of the invention, portion A is constituted by a section of said column located above the feed supply (typically several theoretical plates higher). As an example, if the column comprises 45 theoretical plates, and if the feed is supplied to plate 25, a drawn fraction can be withdrawn from plate 20 and recycled to plate 10 after hydrogenation. Portion B is thus constituted by plates 25 to 45. A portion A which is distinct from and not adjacent to B can thus be defined, which is constituted (for example) by plates 14 to 21. The complementary fractionation zone is typically constituted in this case by plates 1 to 21, and the pre-fractionation zone by plates 22 to 45.

In a second variation of the invention, the distillation column comprises a partition which is disposed so as to separate the portion A of the complementary fractionation zone from zone B, and so that the pre-fractionation zone (4a, 4b, 6, 7) and the complementary fractionation zone (5, 6, 7) comprise at least one common section (6, 7).

Typically, the partition is disposed in a central portion of the column, so as to form a common section (6) at the column head and a common section (7) at the column bottom,
the C4 cut comprising substantially all of the butadiene is recovered from the common section (6) at the column head;
the C5+ enriched cut is recovered from the common section (7) at the column bottom; and
the drawn fraction is produced in said portion A (5) of the complementary fractionation zone, at the central portion of the column, which is isolated from the supply. This variation of the invention produces a high drawn fraction C4/C5+ ratio: in fact, an "intermediate stream" leaves pre-fractionation zones 4a and 4b which are adjacent to the supply, which intermediate stream is a vapour stream which is highly depleted in C5+ (at the head of zone 4a) and a liquid stream that is richer in C5+ (the bottom of 4b), said stream being rectified efficiently in portion A (5) to eliminate the major portion of the C5+ it contains. The variation of the invention with an internal partition can thus produce a high C4/C5+ for the drawn fraction without substantially increasing the total height of the column (in contrast to the variation in which zone A is a superimposed column section, located several plates above the supply). Further, it can typically reduce the reflux ratio by about 20%, for example.

The hydrogenation step is carried out in the presence of hydrogen in a bed of catalyst based, for example, on palladium/gold or palladium/silver or any other known selective hydrogenation catalyst. The choice of catalyst is not an essential element of the invention.

A number of other additional variations or technical arrangements can be employed when carrying out the invention:

The drawn fraction may be recovered as a side stream in the upper half of said portion A (5) of the complementary fractionation zone.

In a further variation, the intermediate stream is sent directly to a bed of catalyst in the presence of hydrogen localized in said portion A of the complementary fractionation zone, below the upper theoretical plate of said portion A, for example in the upper half of portion A. This produces a very compact and integrated design of the invention and prevents transfers of fluids.

Typically, the effluent depleted in acetylenic compounds is recycled to the common section at the column head, preferably a plurality of theoretical plates (for example 3 to 15) above zones A and B, to produce good reflux of acetylenic compounds. This eliminates a large fraction of the acetylenics.

The invention also concerns an apparatus for carrying out the process, in particular an apparatus for treatment of a feed comprising acetylenic compounds, butadiene and a C5+ fraction comprising diethylenic and/or acetylenic compounds comprising:
means (1) for supplying a feed;
distillation means (2) provided with means (24, 26) for recovering a C4 cut comprising substantially all of the butadiene, and means (31, 35) for recovering a C5+ enriched cut, the distillation means also allowing the production of a drawn fraction comprising acetylenic compounds;
means (12, 13) for hydrogenating the drawn fraction; and
means (17) for recycling an effluent which is depleted in acetylenic compounds deriving from the hydrogenation means to the distillation means;
characterized in that the distillation means comprise:
at least one distillation column having a pre-fractionation zone (4a, 4b, 6, 7) connected to means for supplying feed, producing, at least one intermediate level of the column, at least one intermediate stream comprising acetylenic compounds; and
means for transferring at least one intermediate stream with a reduced C5+ content produced in the pre-fractionation zone to at least one complementary fractionation zone (5, 6, 7) at least a portion A (5) of which is distinct and not adjacent to the portion B (4b, 7) of the pre-fractionation zone constituted by the feed supply plate and the lower plates, the portion A also comprising means for withdrawing the drawn fraction from a point in A at which the [C4/C5+] mole ratio is higher than that of the feed, said withdrawal means being connected to hydrogenation means.

Said apparatus, preferably used in accordance with one or more of the dispositions of the process cited above (for example recycling the hydrogenation effluent upwards (and preferably 3 to 15 theoretical plates above zone A and B)) to obtain the advantages described above for the process of the invention.

Instead of plates, the column can comprise a packing in some or all of the zones, which may or may not be structured; this constitutes a technique equivalent to said plates.

When the column comprises a partition, said partition may essentially be constituted by a wall or internal partition. Said internal wall may extend along an axis parallel to the longitudinal axis of the distillation column. Said internal wall may be essentially vertical or inclined at an angle with respect to the vertical of less than 45°.

The partition may also be constituted by internal walls disposed between each plate on a column section.

Said distillation column may typically comprise a total number of plates (unless otherwise stated, theoretical plates, counted from the column head) in the range 20 to 50, preferably in the range 35 to 45.

The pre-fractionation zone and the complementary fractionation zone may typically comprise the same or a different number of theoretical plates. The pre-fractionation zone or the complementary fractionation zone may generally comprise 4 to 15, preferably 9 to 12 theoretical plates which are separated and not communal.

The common section at the column head may comprise ⅓ to ⅔ of the total number of theoretical plates. As an example, it may comprise 10 to 30, preferably 12 to 25 theoretical plates.

The common section at the column bottom will usually comprise 2 to 10 theoretical plates.

The feed may be a fraction of a steam cracking effluent comprising mostly hydrocarbons containing 4 or 5 carbon atoms, preferably mostly 4 carbon atoms.

In particular, the feed may comprise at least 50% by weight, preferably 70% by weight and more preferably 90% by weight of hydrocarbons containing 4 to 5 carbon atoms, or even 4 carbon atoms.

The withdrawal rate for the drawn fraction comprising the acetylenic compounds can advantageously be maintained at a value that is substantially equal to that of the feed supply rate. As an example, the rate of supply of said drawn fraction can be maintained at between 70% and 130% of the value of the flow rate of the feed, preferably between 90% and 100% of the feed flow rate.

It may be advantageous to control the recycle temperature (in particular to chill it) in order not to perturb the column by large local variations in temperature.

Two implementations of the process of the invention will now be described with reference to FIGS. 1 and 2, to provide a better understanding. These implementations are given by way of example and are not limiting in nature. These illustrations of the process of the invention do not include all of the components necessary for implementing it. Only those elements which are necessary for understanding the invention are shown therein; the skilled person will be capable of completing the representations to carry out the invention.

In FIG. 1, the feed is supplied via a line (1) to a distillation column (2) comprising a pre-fractionation zone (6, 4a, 4b, 7), a complementary fractionation zone (6, 5, 7) and a partition (3) disposed in the central portion to separate a portion (4a, 4b) of the pre-fractionation zone on the feed supply side from a portion A (5) of the complementary fractionation zone. The partition (3) is disposed in the column (2) to produce a common section (6) at the column head and a common section (7) at the column bottom between the two said fractionation zones.

An intermediate stream with a reduced C5+ content (with respect to the feed) leaves as a vapour from the upper plate of zone 4a and supplies the complementary fractionation zone (6, 5, 7) at the lower plate of the common zone (6). The liquid from said plate is distributed between zones (4a) and (5). The vapour stream from the upper plate of the common zone (7) is also distributed between zones (4b) and (5).

A fraction that is rich in acetylenic compounds produced in portion A (5) of the complementary fractionation zone is removed as a side stream (11) before being sent to a bed of hydrogenation catalyst (12) inside a hydrogenation reactor (13). The catalyst bed is a fixed bed in downflow mode, i.e. the drawn fraction is introduced into the top of the hydrogenation reactor. Hydrogen is injected into the hydrogenation reactor via a line (14). An effluent which is depleted in acetylenic compounds is recovered via a line (15). Said effluent which is depleted in acetylenic compounds is chilled in a heat exchanger (16) before being recycled to the common section (6) at the head of the distillation column (2) via a line (17).

At the column head (2), a C4 cut comprising substantially all of the butadiene is also recovered, via a line (21). Said cut is then sent via line (21) to a condenser (22), then to a separator (24) via a line (23). A portion of said C4 cut is sent to column (2) in the form of a reflux via a line (25). The other portion of the C4 cut is recovered via a line (26).

A C5 cut that is enriched in oligomers is recovered from the bottom of column (2) via a line (31). A portion of said C5 cut is sent via a line (32) to a reboiler (33) before being recycled to the bottom of the column via a line (34). The other portion of the C5 cut is recovered via a line (35).

Figure 2:
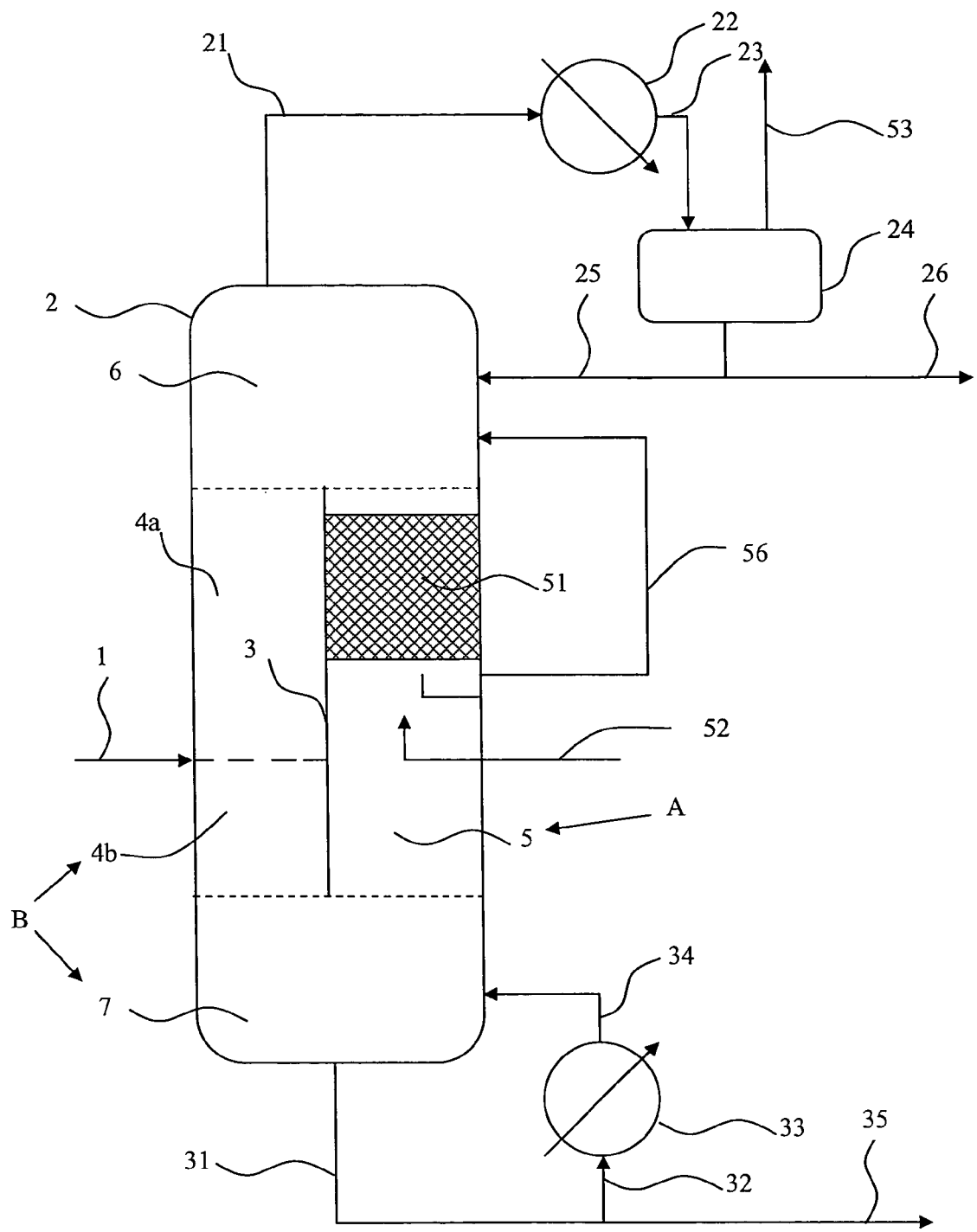

FIG. 2 contains some of the elements of FIG. 1 which have already been described. In particular, elements (1 to 7), (21 to 26) and (31 to 35) are shown in FIG. 1.

In contrast to FIG. 1, the fraction comprising acetylenic compounds produced in the upper portion of the portion A (5) of the complementary fractionation zone is sent directly to a bed of hydrogenation catalyst (51), said bed being localized in the internal portion A of the column, and not inside a separate hydrogenation reactor.

The catalyst bed is a fixed bed in downflow mode, i.e. the fraction that is enriched in acetylenic compounds is introduced via the top of the catalyst bed (51).

Hydrogen is injected into the hydrogenation catalyst bed (51) from beneath via a line (52). A liquid effluent that is depleted in acetylenic compounds is recovered from beneath the catalyst bed (51), and a portion of that effluent is recycled (using a pump, not shown) via a line (56) above zones (4a, 4b, 5) (for example 4 or 5 theoretical plates above), to augment the internal acetylenics-depleted reflux in portions A (5) and B (4b, 7) of the column.

Substantially all of the butadiene is recovered from the head of the column (2) via line (21). This cut is then sent via line (21) to the condenser (22) then to the separator (24) via line (23). The separator (24) is surmounted by a line (53) that can purge excess hydrogen. A portion of the butadiene is sent to the column (2), in the form of a reflux, via line (25). The other portion of the butadiene is recovered via line (26).

EXAMPLE 1 (Prior Art)

A C4+C5 feed from steam cracking effluents the composition of which is described in Table 1 below was treated in accordance with a prior art process (EP-A1-1 217 060). The feed was introduced into a distillation column at a temperature of 64° C., a pressure of 0.60 MPa and at a flow rate of 30 T/h.

This column comprised about 40 theoretical plates (between 50 and 120 real plates depending on the type of plates) and the feed was introduced into the $20^{th}$ plate (theoretical). The column was maintained at an overhead pressure of 0.50 MPa and a bottom pressure of 0.53 MPa. The temperature in the column was kept at 45° C. overhead and 95° C. at the bottom.

At the column head, a C4 cut containing butadiene and about 1200 ppm of acetylenic compounds was recovered. The composition of said C4 cut is shown in Table 1 below. A portion of said cut was re-introduced after condensation and separation, in the form of a reflux, to the column head, while the other portion was recovered for subsequent treatment, for example by solvent extraction. The reflux ratio, i.e. the ratio between the portion of the C4 cut re-introduced to the column head and the totality of the C4 cut recovered overhead, was 2.2.

At the $23^{rd}$ (theoretical) plate of the column, a drawn fraction comprising acetylenic compounds was withdrawn as a side stream with a ratio of the concentration of acetylenic compounds to that of butadiene which was substantially the highest in the column, in this case 0.025 mol/mol. The withdrawal rate for said drawn fraction was equal to the supply rate of the feed.

Said drawn fraction was introduced into a hydrogenation reactor supplied with hydrogen under partial pressure conditions which substantially corresponded to the stoichiometry for the hydrogenation of said acetylenic compounds. Said reactor contained a fixed bed of hydrogenation catalyst functioning in downflow mode, i.e. the liquid feed was introduced into the top of the reactor. The hydrogenation catalyst was palladium-based, stabilized with gold on an alumina support (0.2% by weight of palladium and 0.6% by weight of gold). The hydrogenation reactor was operated under the following conditions:

- absolute pressure: 0.50 MPa;
- temperature: 35° C.;
- space velocity: 4 $h^{-1}$;
- hydrogen flow rate: 30 kg/h.

An effluent which was depleted in acetylenic compounds was recovered then chilled before being recycled to the column at the 6h theoretical plate. Chilling was carried out so that the temperature of said effluent was approximately the same as that of the $6^{th}$ theoretical plate.

This effluent depleted in acetylenic compounds contained olefinic compounds initially present in the feed, butadienes which had not been hydrogenated and oligomers produced in the hydrogenation zone. Said oligomers, which are heavy products, were recovered from the column bottom. A C5 cut comprising said compounds was removed from the column bottom; the composition thereof is shown in Table 1 below. A portion of said C5 cut was introduced into a reboiler and recycled to the column bottom.

In this example, the level at which the feed was supplied to the column ($20^{th}$ plate), the level to which the drawn fraction was drawn off as a drawn fraction ($23^{rd}$ plate) and the level at which the hydrogenated effluent was recycled (6h plate) were selected so as to obtain 1200 ppm by weight of acetylenics in the C4 cut while minimizing losses of 1,3-butadiene.

TABLE 1

|  | Phase; percentages by weight | | |
|---|---|---|---|
|  | Liquid feed | C4, overhead liquid cut | C5, bottom liquid cut |
| PROPANE | 0.01 | 0.01 | 0.00 |
| PROPADIENE | 0.01 | 0.01 | 0.00 |
| PROPYNE | 0.02 | 0.03 | 0.00 |
| ISOBUTANE | 0.27 | 0.40 | 0.00 |
| ISOBUTENE | 13.66 | 20.31 | 0.01 |
| 1BUTENE | 9.06 | 15.27 | 0.01 |
| 13BUTADIENE | 32.52 | 46.99 | 0.04 |
| NBUTANE | 3.53 | 5.24 | 0.02 |
| TRANS2BUTENE | 4.26 | 7.06 | 0.06 |
| VAC | 0.73 | 0.05 | 0.01 |
| CIS2BUTENE | 2.00 | 3.31 | 0.13 |
| 1BUTYNE | 0.20 | 0.07 | 0.01 |
| 12BUTADIENE | 0.40 | 0.25 | 0.21 |
| ISOPENTANE | 1.67 | 0.11 | 4.87 |
| 2METHYL1BUTENE | 3.21 | 0.15 | 9.46 |
| ISOPRENE | 9.52 | 0.34 | 28.28 |
| PENTANE | 3.33 | 0.09 | 9.94 |
| TRANS2PENTENE | 1.43 | 0.04 | 4.28 |
| 13CYCLOPENTADIENE | 9.76 | 0.21 | 29.27 |
| CYCLOPENTENE | 0.48 | 0.01 | 1.45 |
| 1CIS3PENTADIENE | 3.33 | 0.05 | 10.04 |
| CYCLOPENTANE | 0.60 | 0.01 | 1.82 |
| 15ETHYLCYCLOHEXADIENE | 0.00 | 0.00 | 0.10 |

The observed degree of conversion of vinyl-acetylenic compounds (VAC) was 0.95 as calculated in accordance with the relationship:

$1-[(\text{mass of VAC})_{column\ overhead\ outlet}/(\text{mass of VAC})_{inlet}]$ The butadiene losses represented the quantity of butadiene which was not recovered overhead, i.e. the butadiene which was hydrogenated to butene at the hydrogenation reactor to which was added the butadiene which was lost at the column bottom in the C5 cut. The loss of 1,3-butadiene, the commercially important isomer, was 2.85% by weight.

The C5 content at the column head was 1.00% by weight.

EXAMPLE 2 (In Accordance With the Invention)

A C4+C5 steam cracking feed with a composition identical to that of Example 1 was sent to the apparatus of FIG. 1. This feed was introduced into a distillation column comprising an internal wall under the same pressure and temperature conditions as those described in Example 1.

The feed was introduced into the $7^{th}$ theoretical plate of the central portion 4 (4a, 4b) in which the internal wall was located, said plate being the $20^{th}$ theoretical plate in the column. Portion 4 comprised 10 theoretical plates; the column itself comprised 40 theoretical plates. The column was maintained under the same temperature and pressure conditions as those described in Example 1.

At the column head, a C4 cut containing butadiene was recovered. The composition of said C4 cut is shown in Table 2 below. As in Example 1, a portion of said cut was re-introduced to the column head after condensation and separation, in the form of a reflux, while the other portion was recovered for subsequent treatment. The reflux ratio with respect to the distillate was 1.7.

At the $3^{rd}$ theoretical plate of zone A (5) ($16^{th}$ theoretical plate of the column), a drawn. fraction which was rich in acetylenic compounds was withdrawn as a side stream with a ratio of the concentration of acetylenic compounds to that of butadiene of 0.030 mol/mol. The withdrawal rate for said fraction was 30 T/h, i.e. equal to the feed supply rate.

Said drawn fraction which was rich in acetylenic compounds was introduced into a hydrogenation reactor supplied with hydrogen under the same conditions as those described in Example 1

An effluent which was depleted in acetylenic compounds was recovered then chilled before being recycled to the column at the 6$^{th}$ theoretical plate of the common section (6) at the column head. As in Example 1, chilling was carried out so that the temperature of said effluent was approximately the same as that of the 6$^{th}$ theoretical plate.

A C5 cut the composition of which is shown in Table 2 below was removed from the column bottom. A portion of said C5 cut was introduced into a reboiler and recycled to the column bottom.

In this example, the level at which the feed was supplied to the column (20$^{th}$ plate), the level at which the drawn fraction was drawn off as a side stream (16$^{th}$ plate) and the level to which the hydrogenated effluent was recycled (6$^{th}$ plate) were selected so as to obtain a 1,3-butadiene loss of 2.85% by weight, which corresponded to the loss obtained in Example 1.

TABLE 2

| | Phase; percentages by weight | | |
|---|---|---|---|
| | Liquid feed | C4, overhead liquid cut | C5, bottom liquid cut |
| PROPANE | 0.01 | 0.02 | 0.00 |
| PROPADIENE | 0.01 | 0.01 | 0.00 |
| PROPYNE | 0.02 | 0.03 | 0.00 |
| ISOBUTANE | 0.27 | 0.40 | 0.00 |
| ISOBUTENE | 13.66 | 20.44 | 0.03 |
| 1BUTENE | 9.06 | 15.33 | 0.03 |
| 13BUTADIENE | 32.52 | 47.35 | 0.16 |
| NBUTANE | 3.53 | 5.27 | 0.03 |
| TRANS2BUTENE | 4.26 | 7.07 | 0.08 |
| VAC | 0.73 | 0.05 | 0.02 |
| CIS2BUTENE | 2.00 | 3.38 | 0.09 |
| 1BUTYNE | 0.20 | 0.06 | 0.01 |
| 12BUTADIENE | 0.40 | 0.26 | 0.06 |
| ISOPENTANE | 1.67 | 0.11 | 4.80 |
| 2METHYL1BUTENE | 3.21 | 0.08 | 9.48 |
| ISOPRENE | 9.52 | 0.09 | 28.40 |
| PENTANE | 3.33 | 0.02 | 9.96 |
| TRANS2PENTENE | 1.43 | 0.01 | 4.28 |
| 13CYCLOPENTADIENE | 9.76 | 0.02 | 29.25 |
| CYCLOPENTENE | 0.48 | 0.00 | 1.44 |
| 1CIS3PENTADIENE | 3.33 | 0.00 | 9.99 |
| CYCLOPENTANE | 0.60 | 0.00 | 1.80 |
| 15ETHYLCYCLOHEXADIENE | 0.00 | 0.00 | 0.09 |

The observed degree of conversion of vinyl-acetylenic compounds (VAC) was 0.95, calculated using the relationship presented in Example 1.

The amount of acetylenic compounds at the column head was 1100 ppm for a 1,3-butadiene loss which was identical to that of Example 1.

The C5 content at the column head was 0.33% by weight.

The C4/C5+ (C4/C5) ratio of the removed effluent was greater by more than 30% than that of Example 1, indicating a substantially lower quantity of pentadiene and cyclopentadiene, which are precursors for oligomers and polymers. The quantities of oligomers and polymers and traces of c6+ which may be present in the feeds were also greatly reduced. The service life and the selectivity of the hydrogenation catalyst were thus substantially improved.

EXAMPLE 3 (In Accordance With the Invention)

The facility of Example 2 was used, but instead of aiming for a loss of 1,3-butadiene identical to that of Example 1, the amount of acetylenic compounds at the column head was kept identical to that obtained in Example 1, i.e. 1200 ppm.

A C4+C5 steam cracking feed with a composition identical to that of Example 1 was sent to the apparatus of FIG. 1. This feed was introduced into a distillation column comprising an internal wall under the same pressure and temperature conditions as those described in Example 2.

As in Example 2, the feed was introduced into the 20$^{th}$ theoretical plate in the column; the column comprised 40 theoretical plates. The column was maintained under the same temperature and pressure conditions as those described in Example 2.

A C4 cut containing butadiene was recovered at the column head; its composition is shown in Table 3 below. The reflux ratio was 1.8.

At the 16$^{th}$ plate, a drawn fraction was withdrawn as a side stream; the ratio of the concentration of acetylenic compounds to that of butadiene of 0.03 mol/mol. As in Example 2, the withdrawal rate for said fraction was 30 T/h.

Said fraction which had been enriched in acetylenic compounds was introduced into a hydrogenation reactor supplied with hydrogen under the same conditions as those described in Examples 1 and 2.

An effluent which was depleted in acetylenic compounds was recovered then chilled before being recycled to the column at the 6$^{th}$ theoretical plate of the common section at the column head. As in Examples 1 and 2, chilling was carried out so that the temperature of said effluent was approximately the same as that of the 6$^{th}$ theoretical plate.

A C5 cut the composition of which is shown in Table 3 below was removed from the column bottom. A portion of said C5 cut was introduced into a reboiler and recycled to the column bottom.

The compositions at the column head and bottom are shown in Table 3 below.

TABLE 3

| | Phase; percentages by weight | | |
|---|---|---|---|
| | Liquid feed | C4, overhead liquid cut | C5, bottom liquid cut |
| PROPANE | 0.01 | 0.02 | 0.00 |
| PROPADIENE | 0.01 | 0.01 | 0.00 |
| PROPYNE | 0.02 | 0.03 | 0.00 |
| ISOBUTANE | 0.27 | 0.40 | 0.00 |
| ISOBUTENE | 13.66 | 20.43 | 0.03 |
| 1BUTENE | 9.06 | 15.31 | 0.03 |
| 13BUTADIENE | 32.52 | 47.32 | 0.16 |
| NBUTANE | 3.53 | 5.27 | 0.03 |
| TRANS2BUTENE | 4.26 | 7.07 | 0.08 |
| VAC | 0.73 | 0.05 | 0.02 |
| CIS2BUTENE | 2.00 | 3.38 | 0.08 |
| 1BUTYNE | 0.20 | 0.07 | 0.01 |
| 12BUTADIENE | 0.40 | 0.27 | 0.06 |
| ISOPENTANE | 1.67 | 0.13 | 4.77 |
| 2METHYL1BUTENE | 3.21 | 0.09 | 9.46 |
| ISOPRENE | 9.52 | 0.10 | 28.40 |
| PENTANE | 3.33 | 0.02 | 9.96 |
| TRANS2PENTENE | 1.43 | 0.01 | 4.28 |
| 13CYCLOPENTADIENE | 9.76 | 0.03 | 29.27 |
| CYCLOPENTENE | 0.48 | 0.00 | 1.44 |
| 1CIS3PENTADIENE | 3.33 | 0.00 | 10.00 |
| CYCLOPENTANE | 0.60 | 0.00 | 1.80 |
| 15ETHYLCYCLOHEXADIENE | 0.00 | 0.00 | 0.10 |

The 1,3-butadiene losses were 2.75%. The C5 content at the column head was 0.38% by weight. The C4/C5 ratio was increased in a proportion that was substantially identical to that of Example 2.

Using a hydrogenation reactor operating under the same conversion conditions as those in the prior art, the invention can:

reduce the quantity of oligomeric and polymeric precursors and/or oligomers and polymers sent to hydrogenation, and thus improve the activity and typically the selectivity of said catalyst, as well as its service life;

for a constant overall conversion, it can increase the overall selectivity of the process; and for a constant overall selectivity, it can increase the overall conversion of the process.

The invention claimed is:

1. A process for treating a feed comprising C4 acetylenic compounds, butadiene and a C5+ fraction comprising diethylenic and/or acetylenic compounds, including but not limited to pentadiene and/or cyclopentadiene, in which:

i) the feed is sent to a step for distillation carried out in a distillation column, to separate a C4 cut that comprises substantially all of the butadiene in the feed and is recovered from the head of said column, a cut that is enriched in C5+ is recovered from a bottom zone of the column and a drawn fraction comprising C4 acetylenic compounds is withdrawn from a side stream of the column;

ii) at least a portion of said drawn fraction is treated in at least one hydrogenation step; and iii) an effluent that is depleted in acetylenic compounds from the hydrogenation step is recycled to the distillation step;

wherein the distillation step comprises:

an initial step for pre-fractionation of the feed, which latter is supplied to a pre-fractionation zone (4a, 4b, 6, 7) included in a distillation column, comprising a feed plate and lower plates, to obtain at least one intermediate stream with a reduced C5+ content at one or more intermediate levels of the column; and at least one step for fractionation by distillation of the intermediate stream or streams, carried out in a complementary fractionation zone at least a portion A (5) of which is distinct from and not adjacent to portion B (4b, 7) of the pre-fractionation zone constituted by the feed supply plate and the lower plates, to withdraw the drawn fraction from a point in A located at a level in the column that is higher than the feed supply point and for which the mole ratio [C4/C5+] is higher than that of the feed;

and in that recycling said effluent which is depleted in acetylenic compounds from the hydrogenation step is carried out to a level in the distillation column located above the level from which said drawn fraction is withdrawn and above said portions A and B.

2. A process according to claim 1, in which said portion A is constituted by a section of said column located above the feed supply.

3. A process according to claim 1, in which the distillation column comprises a partition disposed so as to separate said portion A of the complementary fractionation zone from said zone B, and in that the pre-fractionation zone (4a, 4b, 6, 7) and the complementary fractionation zone (5, 6, 7) comprise at least one common section (6, 7).

4. A process according to claim 3, in which the partition is disposed in a central portion of the column to produce a common section (6) at the column head and a common section (7) at the column bottom, the C4 cut comprising substantially all of the butadiene is recovered from the common section (6) at the column head;

the C5+ enriched cut is recovered from the common section (7) at the column bottom; and the drawn fraction is produced in said portion A (5) of the complementary fractionation zone, at the central portion of the column.

5. A process according to claim 3, in which said intermediate stream is sent directly to a bed of catalyst in the presence of hydrogen located in said portion A of the complementary fractionation zone below the upper theoretical plate of said portion A.

6. A process according to claim 3, in which the effluent depleted in acetylenic compounds is recycled to the common section at the column head.

7. A process according to claim 1, in which said drawn fraction is recovered by withdrawal as a side stream from the upper half of said portion A (5) of the complementary fractionation zone.

8. A process according to claim 1, wherein said butadiene is present in a higher concentration in the feed than other individual hydrocarbons.

9. An apparatus for treating a feed comprising acetylenic compounds, butadiene and a C5+ fraction comprising diethylenic and/or acetylenic compounds, comprising:

a distillation column (2) provided with means (1) for supplying feed, means (24, 26) for recovering a C4 cut comprising substantially all of the butadiene from the column head, and means (31, 35) for recovering a cut enriched in C5+, said distillation column also allowing production of a drawn fraction comprising acetylenic compounds;

in which the distillation column comprises a plate supplying the feed and lower plates:

a) a pre-fractionation zone (4a, 4b, 6, 7) connected to the means for supplying feed, for producing at least one intermediate level of the column, at least one intermediate stream comprising acetylenic compounds; and b) means for transferring at least one intermediate stream with a reduced C5+ content produced in the pre-fractionation zone to at least one complementary fractionation zone (5, 6, 7) at least a portion A (5) of which is distinct from and not adjacent to a portion B (4b, 7) of the pre-fractionation zone constituted by the plate supplying the feed and the lower plates, the portion A also comprising means for withdrawing said drawn fraction from a point in A at which the [C4/C5+] mole ratio is higher than that of the feed, said withdrawal means being disposed at a level that is higher than that of the feed supply means, and being connected to hydrogenation means (12, 13);

for hydrogenating the drawn fraction;

and means (17) for recycling an effluent which is depleted in acetylenic compounds deriving from the hydrogenation means to the distillation column, said recycle being carried out to a level in the distillation column located above the level from which said drawn fraction is withdrawn, and above said portions A and B.

* * * * *